(12) United States Patent
Akpala

(10) Patent No.: US 11,301,786 B2
(45) Date of Patent: *Apr. 12, 2022

(54) DETERMINING INTEREST AREAS AT A VENUE LOCATION OF AN EVENT

(71) Applicant: StubHub, Inc., San Francisco, CA (US)

(72) Inventor: Romiwa Charles Akpala, Fremont, CA (US)

(73) Assignee: StubHub, Inc., San Francisco, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/788,054

(22) Filed: Feb. 11, 2020

(65) Prior Publication Data

US 2020/0184384 A1 Jun. 11, 2020

Related U.S. Application Data

(63) Continuation of application No. 14/633,087, filed on Feb. 26, 2015, now Pat. No. 10,592,826.

(51) Int. Cl.
*G06Q 10/02* (2012.01)
*G06Q 30/06* (2012.01)

(52) U.S. Cl.
CPC ......... *G06Q 10/02* (2013.01); *G06Q 30/0623* (2013.01)

(58) Field of Classification Search
None
See application file for complete search history.

(56) References Cited

U.S. PATENT DOCUMENTS

| 5,948,040 A | 9/1999 | DeLorme et al. |
| 8,126,748 B2 | 2/2012 | Sunshine et al. |

(Continued)

FOREIGN PATENT DOCUMENTS

| CN | 102667839 A | 9/2012 |
| CN | 102915331 A | 2/2013 |
| JP | 2008544346 A | 12/2008 |

OTHER PUBLICATIONS

Parameters Undefined: Crowdsourcing the Best MLB Foul Ball Seats, SportTechie.com, ("Parameters Undefined") 6 pages dated Jun. 18, 2014; available at and retrieved from: <http://www.sporttechie.com/2014/06/18/uncategorized/by-joel-carben-parameters-undefined-crowdsourcing-the-best-foul-ball-seats-in-mlb> on Feb. 28, 2017.

(Continued)

*Primary Examiner* — Paul Danneman
(74) *Attorney, Agent, or Firm* — McDermott Will & Emery LLP

(57) ABSTRACT

System, computer-readable medium, and methods are provided to determine interest areas of an event held at a venue location. A communication interface of a server device may receive a search request for an event, where the search request includes event data indicating a venue location of the event. An interest processing component of the server device determines an excitement interest in the event based on at least one of the event data and interest data of a user account. An area processing component of the server device determines one or more excitement areas at the venue location based at least on the excitement interest in the event. A ticket processing component of the server device determines one or more available event tickets for the event at the venue location based at least on the one or more excitement areas at the venue location. A transceiver of the communication interface that transmits an indication of the one or more available event tickets to a client device configured to access the one or more available event tickets.

20 Claims, 9 Drawing Sheets

(56) References Cited

U.S. PATENT DOCUMENTS

| | | | |
|---|---|---|---|
| 8,732,007 | B2 | 5/2014 | Gibson et al. |
| 10,592,826 | B2* | 3/2020 | Akpala .............. G06Q 30/0623 |
| 2002/0099562 | A1 | 7/2002 | Bruce, Sr. et al. |
| 2002/0103849 | A1 | 8/2002 | Smith |
| 2002/0116343 | A1 | 8/2002 | Nakamura et al. |
| 2002/0194093 | A1 | 12/2002 | Chow |
| 2003/0036963 | A1 | 2/2003 | Jacobson et al. |
| 2003/0236736 | A1 | 12/2003 | Harmon et al. |
| 2004/0024682 | A1 | 2/2004 | Popovitch |
| 2004/0039696 | A1 | 2/2004 | Harmon et al. |
| 2007/0039024 | A1 | 2/2007 | Krajcev et al. |
| 2007/0265892 | A1 | 11/2007 | Valentino |
| 2008/0162211 | A1* | 7/2008 | Addington ............. G06Q 40/04 705/14.5 |
| 2008/0172632 | A1 | 7/2008 | Stambaugh |
| 2008/0255889 | A1 | 10/2008 | Geisler et al. |
| 2008/0312010 | A1* | 12/2008 | Marty ................ A63B 24/0021 473/447 |
| 2009/0063206 | A1 | 3/2009 | Payne et al. |
| 2009/0164315 | A1 | 6/2009 | Rothman |
| 2010/0113072 | A1 | 5/2010 | Gibson et al. |
| 2011/0289065 | A1* | 11/2011 | Wells ................ G06F 16/9577 707/706 |
| 2012/0123813 | A1 | 5/2012 | Sunshine et al. |
| 2012/0173310 | A1 | 7/2012 | Groetzinger et al. |
| 2013/0124234 | A1 | 5/2013 | Nilsson et al. |
| 2014/0032371 | A1* | 1/2014 | Traina ................ G06Q 30/0601 705/26.81 |
| 2014/0046802 | A1 | 2/2014 | Hosein et al. |
| 2014/0067939 | A1* | 3/2014 | Packard ............. H04N 21/2668 709/204 |
| 2014/0129629 | A1 | 5/2014 | Savir |
| 2014/0297666 | A1* | 10/2014 | Morris ................ G06F 16/2453 707/754 |
| 2015/0242763 | A1 | 8/2015 | Zamer |

OTHER PUBLICATIONS

Taylor Soper, "Want to catch more foul balls? IdealSeat shows you where to sit at the ballgame" ("Geekwire 1") 8 pages dated Jun. 26, 2013; available at and retrieved from: <http://www.geekwire.com/2013/idealseat> on Feb. 28, 2017.

Testing IdealSeat: Can big data help me catch a foul ball? ("Geekwire 2") 9 pages, dated Jul. 9, 2013; available at and retrieved from: <http://www.geekwire.com/2013/idealseat-safeco-field-big-data> on Feb. 28, 2017.

Josh Kearns, Seattle company creates seating app to give fans best shot at foul ball, ("MyNorthwest.com") 3 pages dated Jun. 27, 2013; available at and retrieved from: <http://www.mynorthwest.com/27468/seattle-company-creates-seating-app-to-give-fans-best-shot-at-foul-ball> on Feb. 28, 2017.

IdealSeat tracks best foul ball spots for fans, SI.com ("SI.com") 4 pages dated Aug. 15, 2014; available at and retrieved from: <http://www.si.com/mlb/2014/08/15/ap-bbo-ideal-seat> on Feb. 28, 2017.

Joel Carben, "Research Teams—Now Recruiting For All 30 Stadiums!" IdealSeat.com ("Research Teams") 3 pages dated Apr. 30, 2014; available at and retrieved from: <http://idealseat.com/research-teams-now-recruiting-for-all-30-stadiums> on Feb. 28, 2017.

U.S. Office Action, as issued in connection with U.S. Appl. No. 14/280,536, dated Aug. 19, 2020, 31 pgs.

U.S. Office Action, as issued in connection with U.S. Appl. No. 14/280,536, dated Dec. 30, 2020, 25 pgs.

Chinese Office Action, as issued in connection with Chinese Application No. 201680012471.1, dated Jan. 29, 2021, 17 pgs.

Chinese Office Action, as issued in connection with Chinese Application No. IP19103004PZ.A, dated May 6, 2020, 21 pgs.

Korean Office Action, as issued in connection with Korean Application No. 10-2019-7017212, dated May 12, 2020, 5 pgs.

Non-Final Office Action received for U.S. Appl. No. 12/275,783, dated Mar. 16, 2011, 8 pgs.

Response to Non-Final Office Action filed Jun. 16, 2011, for U.S. Appl. No. 12/275,783, 8 pgs.

Final Office Action received for U.S. Appl. No. 12/275,783, dated Aug. 25, 2011, 9 pgs.

Response to Final Office Action filed Nov. 21, 2011 for U.S. Appl. No. 12/275,783, 9 pgs.

Notice of Allowance received for U.S. Appl. No. 12/275,783, dated Jan. 3, 2014, 9 pgs.

Non-Final Office Action received for U.S. Appl. No. 14/280,536, dated Oct. 21, 2015, 9 pgs.

Response to Non-Final Office Action filed Jan. 21, 2016 for U.S. Appl. No. 14/280,536, 14 pgs.

Non-Final Office Action received for U.S. Appl. No. 14/280,536, dated May 19, 2016, 10 pgs.

Response to Non-Final Office Action filed Aug. 18, 2016 for U.S. Appl. No. 14/280,536, 15 pgs.

Final Office Action received for U.S. Appl. No. 14/280,536, dated Mar. 2, 2017, 11 pgs.

Response to Final Office Action filed May 1, 2017 for U.S. Appl. No. 14/280,536, 14 pgs.

Advisory Action received for U.S. Appl. No. 14/280,536, dated Jun. 16, 2017, 9 pgs.

Non-Final Office Action received for U.S. Appl. No. 14/280,536, dated Dec. 27, 2017, 21 pgs.

Response to Non-Final Office Action filed Mar. 27, 2018 for U.S. Appl. No. 14/280,536, 17 pgs.

Final Office Action received for U.S. Appl. No. 14/280,536, dated May 2, 2018, 21 pgs.

Response to Final Office Action filed Jul. 2, 2018 for U.S. Appl. No. 14/280,536, 18 pgs.

Interview conducted for U.S. Appl. No. 14/280,536, dated Jul. 9, 2018, 2 pgs.

Advisory Action received for U.S. Appl. No. 14/280,536, dated Jul. 23, 2018, 4 pgs.

Non-Final Office Action received for U.S. Appl. No. 14/280,536, dated Nov. 5, 2018, 23 pgs.

Interview Summary received for U.S. Appl. No. 14/280,536, dated Jan. 18, 2019, 3 pgs.

Response to Non-Final Office Action filed Feb. 13, 2019 for U.S. Appl. No. 14/280,536, 19 pgs.

Final Office Action received for U.S. Appl. No. 14/280,536, dated Mar. 7, 2019, 24 pgs.

Response to Final Office Action filed Apr. 30, 2019 for U.S. Appl. No. 14/280,536, 20 pgs.

Interview conducted for U.S. Appl. No. 14/280,536, dated May 6, 2019, 2 pgs.

Advisory Action received for U.S. Appl. No. 14/280,536, dated May 9, 2019, 3 pgs.

Non-Final Office Action received for U.S. Appl. No. 14/633,087, dated Aug. 31, 2017, 17 pgs.

Response to Non-Final Office Action filed Nov. 30, 2017 for U.S. Appl. No. 14/633,087, 17 pgs.

Final Office Action received for U.S. Appl. No. 14/633,087, dated Feb. 26, 2018, 12 pgs.

Response to Final Office Action filed Apr. 25, 2018 for U.S. Appl. No. 14/633,087, 11 pgs.

Non-Final Office Action received for U.S. Appl. No. 14/633,087, dated Aug. 16, 2018, 13 pgs.

Response to Non-Final Office Action filed Nov. 30, 2018 for U.S. Appl. No. 14/633,087, 12 pgs.

Final Office Action received for U.S. Appl. No. 14/633,087, dated Jan. 17, 2019, 13 pgs.

Response to Final Office Action filed Apr. 17, 2019 for U.S. Appl. No. 14/633,087, 13 pgs.

Non-Final Office Action received for U.S. Appl. No. 14/633,087, dated Jul. 25, 2019, 14 pgs.

Interview conducted for U.S. Appl. No. 14/633,087, dated Sep. 9, 2019, 3 pgs.

Response to Non-Final Office Action filed Oct. 18, 2019 for U.S. Appl. No. 14/633,087, 12 pgs.

Notice of Allowance received for U.S. Appl. No. 14/633,087, dated Nov. 6, 2019, 9 pgs.

(56) References Cited

OTHER PUBLICATIONS

International Search Report and Written Opinion, as issued in connection with International Patent Application No. PCT/US2016/019422, dated May 5, 2016, 9 pgs.
Extended European Search Report Received for European Patent Application No. 16756313.9, dated Jun. 13, 2018, 6 pgs.
Response to European Search Report filed Nov. 28, 2018, for European Patent Application No. 16756313.9, 14 pgs.
Communication Pursuant to Article 94(3) EPC received for European Patent Application No. 16756313.9, dated Feb. 7, 2019, 6 pgs.
Response to Communication Pursuant to Article 94(3) EPC filed Apr. 17, 2019, for European Patent Application No. 16756313.9, 14 pgs.
Summons to Attend Oral Proceedings received for European Patent Application No. 16756313.9, dated May 8, 2019, 7 pgs.
Office Action received for Korean Patent Application No. 10-2017-7027263, dated May 24, 2018, 15 pgs.
Response to Office Action filed Sep. 20, 2018, for Korean Patent Application No. 10-2017-7027263, 33 pgs.
Final Office Action received for Korean Patent Application No. 10-2017-7027263, dated Feb. 25, 2019, 10 pgs.
Response to Office Action filed Apr. 26, 2019, for Korean Patent Application No. 10-2017-7027263, 18 pgs.
Final Office Action received for Korean Patent Application No. 10-2017-7027263, dated May 15, 2019, 7 pgs.
Office Action received for Korean Patent Application No. 10-2019-7017212, dated Oct. 25, 2019, 16 pgs.
Response to Office Action filed Dec. 26, 2019, for Korean Patent Application No. 10-2019-7017212, 36 pgs.
United States Office Action, as issued in connection with U.S. Appl. No. 14/280,536, dated May 12, 2020, 31 pgs.

\* cited by examiner

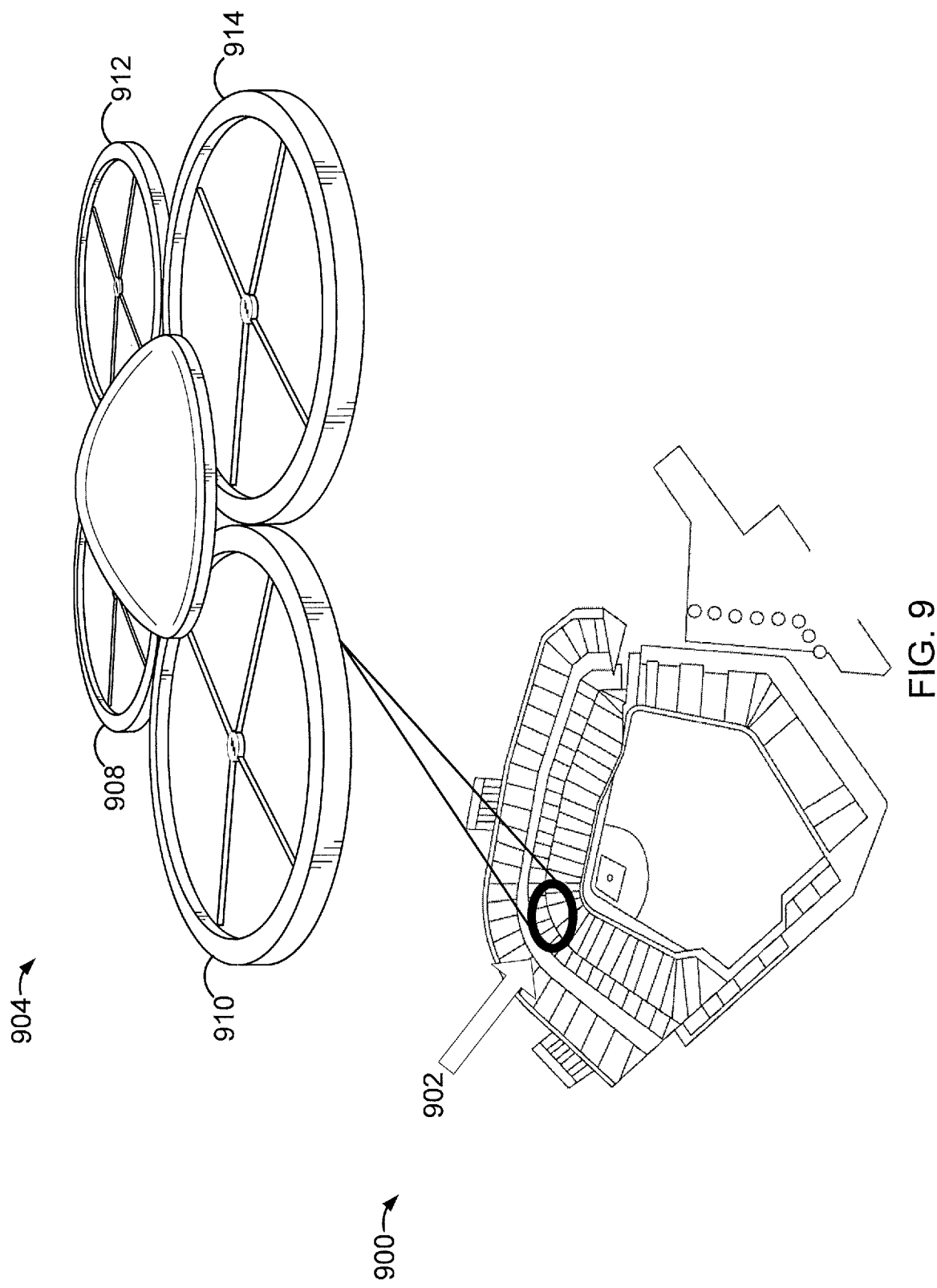

DETERMINING INTEREST AREAS AT A VENUE LOCATION OF AN EVENT

CROSS-REFERENCE TO RELATED APPLICATIONS

This application is a continuation of U.S. patent application Ser. No. 14/633,087, filed on Feb. 26, 2015; the disclosure of which is incorporated herein by reference in its entirety.

TECHNICAL FIELD

This disclosure generally relates venue locations of events, and more particularly, to computing devices configured to provide data related to interest areas at a venue location of an event.

BACKGROUND

In various circumstances, event tickets may be purchased for movies, concerts, comedic performances, sporting events, and the like. For example, a user may search for a sporting event using event-ticket service (e.g., STUBHUB®, of San Francisco, Calif.). By entering the date of the event and/or the location, the user may find tickets for the event and pay for the tickets to attend the event. Yet, due to the location of the seats (e.g., the area where the user's seats are located at the venue), the user may leave the event dissatisfied with the level of entertainment. Under such circumstances, the user may have had a better experience sitting in other areas possibly closer to the players competing in the sporting event, thereby yielding higher levels of excitement from the user. Often times, it may be difficult for the user to predict which areas are best to sit in which will provide the most enjoyment. As such, various difficulties may result in unpleasant experiences for users and possible losses in sales for the entities hosting the events.

BRIEF DESCRIPTION OF THE DRAWINGS

FIG. 9 illustrates an exemplary client device, according to an embodiment.

Figure 1:
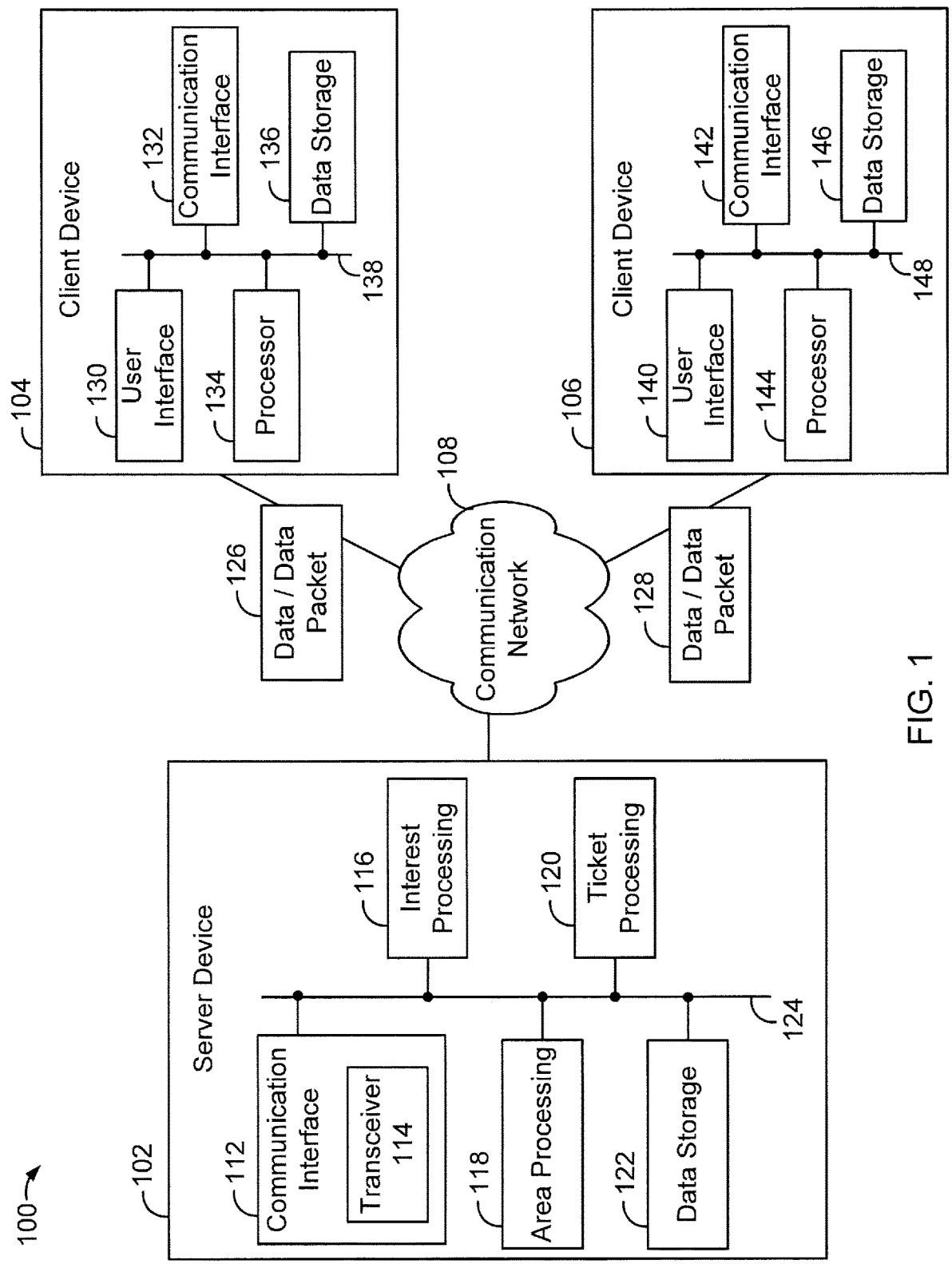
FIG. 1 is a block diagram of an example system, according to an embodiment.

Embodiments of the present disclosure and their advantages may be understood by referring to the detailed description that follows. It should be appreciated that like reference numerals are used to identify elements illustrated in one or more of the figures, where the figures illustrate various examples for purposes of examples and explanation related to the embodiments of the present disclosure and not for purposes of limitation.

DETAILED DESCRIPTION

In various embodiments, a system running an event-ticket service may receive a search request for an event at a particular venue location. Based on the search request for tickets to an event and possibly other data gathered about the user, the system may identify certain areas of the venue location likely to be enjoyed by the user. For example, based on a search request for a baseball game at a particular stadium, the system may identify be excitement and/or thrill areas of the stadium where the user may have opportunities to interact with the players in the baseball game. In particular, the system may identify areas proximate to player entrances, player exits, and player rest areas where fans can give "high-fives" to the players. Even further, the system may identify areas at the particular venue location where celebrities are likely to sit, possibly due to various factors such as the importance of the game, the city of the venue location, the home team, the visiting team, and/or additional data collected by the system.

In some embodiments, the system may analyze data to determine areas that are likely to receive souvenirs, keepsakes, and/or mementos from the particular event. For example, for sporting events, the system may determine area likely to receive baseballs from home runs, batting gloves from players at bat, footballs from touchdowns, jerseys from the players, and/or other forms of sporting apparel. In some instances, the system may compute the probability of areas in a baseball game where foul balls or home run balls are likely to land. The system may identify these areas based on statistical analyses and behaviors of players possibly indicating strong hitters on a given team, and/or weak pitchers likely to allow more hits and/or home runs. The system may also identify such areas based on offensive and/or defensive capabilities, player behaviors indicating players that previously have thrown baseballs into the crowd, and/or additional forms data collected by the system. In the context of football games, for example, the system may determine areas at the stadium where footballs are likely to land due to field goals and/or areas where certain players are likely to throw footballs to fans after scoring touchdowns, among other possibilities.

In some embodiments, based on the areas identified and/or determined, the system may recommend available event tickets in these areas. Further, the system may provide estimated excitement levels of the event based on the areas where the tickets are assigned to. Yet further, the excitement levels may be based on various characteristics of the game such as the expected tempo of the game, a must-win situation for the home team to make post-season playoffs or tournaments, certain players in the game possibly coming back from injuries, among other factors that may affect the excitement level. As such, users can discover particular events and also areas at the venue location based on an expected level of entertainment specific (e.g., customized and/or tailored) to a user.

In some embodiments, search requests for event tickets may be represented by various forms of data including event data, venue location data, user account data, and/or user interest data, among other types of data. In some instances, various types of such data may be represented by packets of data, possibly referred to as data packets and/or packets. In some instances, a server may manage data packets corresponding to multiple event tickets, and the server may transmit such data to a client device such as a user's smartphone. For example, consider a scenario where a user searches for a particular event using an event-ticket service to search for available tickets to the event. In some instances, the user may search for the particular event using the smartphone, thereby sending a search request to the server. The server device may receive the search request and locate one or more event tickets based on the information in the request and/or other data gathered about the user. The server device may transmit to the smartphone data packets indicating the available event tickets. As such, the available event tickets may be shown on a display of the smartphone.

FIG. 1 is a block diagram of an example system 100, according to an embodiment. As shown, the system 100 includes multiple computing devices, such as a server device 102, a client device 104, and/or a client device 106, among other types of possible computing devices. Server device 102 may be configured to support, operate, run, and/or manage an event-ticket service that searches for available event tickets, and/or transmits data of such tickets to client devices 104 and/or 106. As such, also included in system 100 is a communication network 108. The system 100 may operate with more or less than the computing devices shown in FIG. 1, possibly communicating with each device via the communication network 108. In various embodiments, the server device 102, the client device 104, and the client device 106 are configured for communicating with each device via the communication network 108.

In some embodiments, the communication network 108 may be a packet-switched network configured to provide digital networking communications and/or exchange data of various forms, content, type, and/or structure. The communication network 108 may correspond to small scale communication networks, such as a private and/or local area network. The communication network 108 may also correspond to a larger scale network, such as a wide area network or the Internet, possibly accessible by the various devices of system 100. The communication network 108 may include network adapters, switches, routers, network nodes, and/or various buffers and queues to exchange data packets. For example, the communication network 108 may be configured to carry data packets such as a first data packet 126 and a second data packet 128 including event data, venue location data, user account data, user interest data, available event ticket data, and/or other types of data. The communication network 108 may exchange such packets 126 and/or 128 between the server device 102, the client device 104, and/or the client device 106 using various protocols such as Transmission Control Protocol/Internet Protocol (TCP/IP), among other possibilities.

In some embodiments, the system 100 may implement software components that operate to perform under various implementations in accordance with this disclosure and or the accompanying figures. For example, system 100 may include stand-alone and/or enterprise-class server devices, other server devices implementing one or more operating systems such as client- and/or server-based operating system. It can be appreciated that the client devices and/or server devices illustrated in FIG. 1 may be deployed in other ways such that the operations performed and/or the services provided by such client devices may be combined or separated for a given embodiment and may be performed by a greater number or fewer number of devices and/or server devices. One or more devices may be operated and/or maintained by the same or different entities.

In some instances, the system 100 includes server device 102 that may be configured to perform various operations in accordance with this disclosure and the accompanying figures. For example, the server device 102 may be configured to receive a search request for an event that indicates the venue location of the event. The server device 102 may determine an excitement or thrill interest in the event based on the event data and/or interest data accessed from the user's account. The server device 102 may determine one or more areas at the venue location based on the determined interest in the event. The server device 102 may determine one or more available event tickets for the event at the venue location based on the one or more interest areas. The server device 102 may transmit an indication of the one or more available event tickets to the client device 104 and/or 106 configured to access the user account.

In some embodiments, a user account, possibly also referred to as an account, may be a compilation of data associated with a user and/or the user's interests. As such, some examples of accounts may include accounts for accessing event tickets via an event-ticket service. Further, some examples of accounts may include social networking accounts, e-mail accounts, financial accounts, e-commerce accounts, smartphone accounts, and/or accounts with service providers, among other possibilities. For example, an account for a particular user may include data related to the user, data related to the user's interest, and/or data representing the user. Further, the user may provide various types of data to the account, such as the user's preferences in areas of avenue location of an event.

The user account may be displayed on a computing device, such as those described above in relation to FIG. 1. Thus, the user account may be displayed on a smartphone, a laptop computer, and/or a wearable computing device that may be used to access the account. The user may operate the computing device and their account may be managed on the computing device. For example, the computing device may be used to receive event ticket data, send data based on search requests, and/or store event ticket data associated with the account such that the details regarding the event tickets may be viewed on the computing device. Further, login information may be provided to authenticate the account and payment information may be provided to secure and/or purchase the event ticket for the account.

In some embodiments, a user account may indicate various individuals that the user may be interested in. For example, the user account may identify athletes, sportspersons, celebrities, political figures, politicians, legislators, famous persons, and/or other persons that the user may be interested in. Further, the user account may identify movies, sporting teams, music groups, and/or comedians that the fan may be interested in. Yet further, an event-ticket service may gather data regarding the user and compile the data into the user's account. In particular, the service may track previous purchases of event tickets and particular seats selected for a given venue location, possibly indicative of future events that the user may be interested in. Further, the service may track the user's preferences in seats at various venue locations when securing event tickets. As such, the service may provide recommendations when the user is viewing tickets.

In some embodiments, an account may be created by one or more users. Further, the account may be created by event-ticket services, applications, websites, and/or other services, among other possibilities. As such, various users may have access to a particular account of an event-ticket service. For example, the user may be a corporation with access to a corporate account, possibly for its employees, staff, worker personnel, and/or contractors, among other individuals. Yet further, a user may be a computing device, a computing system, a robotic system, and/or another form of technology capable of sending and receiving data corresponding to the account. A user may provide a login, a password, a code, authentication data, biometric data, and/or other types of data to access the account.

In some embodiments, a user may have a single account representing the user for an event-ticket website among multiple other accounts described above such as social networking accounts, e-mail accounts, and/or financial accounts, as well as websites, applications, and/or other services. For example, a user could opt to use their e-mail account or social network account as a multi-purpose account for accessing event-ticket services and securing an event ticket for the account. For example, the user may use the multi-purpose account to search for event tickets to a particular event. The user may select one or more event tickets to an event at a venue location. Further, the user may be prompted for login and/or authentication information, and thereby submit the requisite information to proceed with securing the event tickets. In addition, the user may be prompted for payment and/or delivery information, and thereby submit the requisite information to proceed with securing the event tickets, possibly to receive confirmation information for securing the event tickets, among other possibilities.

In some embodiments, the server device 102 may take a variety of forms and may include various components, including for example, a communication module 112, a transceiver 114, an interest processing component 116, an area processing component 118, a ticket processing component 120, and a data storage 122, any of which may be communicatively linked to the other components via a system bus, network, or other connection mechanism 124.

The communication module 112 may take a variety of forms and may be configured to allow the server device 102 to communicate with one or more devices according to any number of protocols. For example, the communication interface 112 may include the transceiver 114 configured to allow the server device 102 to communicate with the client devices 104 and/or 106 via communication network 108. In one example, the communication interface 112 and/or the transceiver 114 may take the form of a wired interface, such as an Ethernet interface. As another example, the communication interface 112 and/or the transceiver 114 may take the form of a wireless interface, such as a cellular interface, a WI-FI interface, another short-range, point-to-multipoint voice and/or data transfer communication interface, such as BLUETOOTH. In some instances, the communication interface 112 may send/receive data to/from client devices 104 and/or 106.

The processing components 116, 118, and/or 120 may be part of a general purpose processor (e.g., a microprocessor) and/or a special purpose processor such as a digital signal processor (DSP), an application specific integrated circuit (ASIC), a programmable system on chip (PSOC), field-programmable gate array (FPGA), and/or another processing component configured to process search requests, event data, venue location data, event ticket data, among other forms of data described above. For example, the data packets 126 and/or 128 may be sent by the client devices 104 and 106, respectively, over the communication network 108. Further, the data packets 126 and 128 may include IP addresses of the client device 104 and 106, respectively. One or more of the processing components 116, 118, and/or 120 may access the data packets 126 and/or 128 associated with respective accounts of an event-ticket service accessed by the client devices 104 and 106, respectively. Yet further, the data packets 126 and 128 may be accessible via protocols such as Transmission Control Protocol/Internet Protocol (TCP/IP). In various embodiments, each of the packets 126 and 128 may include 1,000 to 1,500 bytes, among other possible ranges.

The data storage 122 may include one or more of volatile, non-volatile, removable, and/or non-removable storage components, such as magnetic, optical, or flash storage, and may be integrated in whole or in part with processing components 116, 118, and/or 120. Further, the data storage 122 may include or take the form of a non-transitory computer-readable storage medium, having stored thereon machine-readable instructions (e.g., compiled or non-compiled program logic and/or machine code) that, when executed by server device 102, cause the server device 102 to perform operations, such as those described in this disclosure and illustrated by the accompanying figures. Yet further, the data storage 122 may include an event-ticket database including data associated with available event tickets by price, venue location, event data, event time, section, row, and/or seat identifications, among other forms of data. In addition, the data storage 122 may include other databases such as The data storage 122 may include additional databases to support various operations related to determining or acquiring statistics, analyses, probabilities, analytics, and/or other data possibly related to an event. For example, the data storage 122 may include one or more of such databases for a sports event. As such, the data storage 122 may include player and/or game statistics, player tendency data, behavioral data, player rosters and/or starting line-ups, player availabilities, injury statuses/updates, and/or other data related to player and/or game analytics. In some instances, various forms of such data may be retrieved by the client devices 104 and/or 106 (e.g., a third party), and the server device 102 may gather such data over the communication network 108, thereby compiling and/or updating the data into the data storage 122, possibly in real-time. As such, various such databases in the data storage 122 may be used to facilitate the operations described in this disclosure and illustrated by the accompanying figures.

The interest processing component 116 may determine various types of interests in an event based on event data and/or interest data of a user account. The area processing component 118 may determine one or more excitement areas at a venue location based on the event data and/or the interest data of the user account. The ticket processing component 120 may determine the one or more available event tickets for the event at the venue location based on the one or more determined areas at the venue location. The ticket processing component 120 may search and identify the available event tickets from the data storage 122, possibly including an event-ticket database. The processing components 116, 118, and/or 120 may include pre-configured, dedicated circuits, and/or hardware components of server device 102 to determine interests in events and/or areas at venue locations. Further, the processing components 116, 118, and/or 120 may include circuits and/or hardware components that are configured as needed to perform each component's respective operations.

As with server device 102, client devices 104 and 106 may be configured to perform a variety of operations such as those described in this disclosure and illustrated by the accompanying figures. For example, client devices 104 and 106 may be configured to exchange data packets with the server device 102, such as data packets 126 and 128 including event data, venue location data, interest data, data indicating available event tickets, and/or other types of data described above. Client devices 104 and 106 may take a variety of forms, including for example, a personal computer (PC), a smartphone, a wearable computer, a laptop/tablet computer, a merchant device, a smart watch with appropriate computer hardware resources, a head-mountable display, other types of wearable devices, and/or other types of computing devices capable of transmitting and/or receiving data, among other possibilities. Client devices 104 and 106 may include various components, including, for example, input/output (I/O) interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

The I/O interfaces 130 and 140 may be configured for facilitating interaction between client devices 104 and 106 and users of client devices 104 and 106, possibly accessing their accounts via client devices 104 and 106, respectively. For example, the I/O interfaces 130 and 140 may be configured to receive inputs from a user and provide outputs to the user. Thus, the I/O interfaces 130 and 140 may include input hardware such as a touchscreen, a touch sensitive panel, a microphone for receiving voice commands, a computer mouse, a keyboard, and/or other input hardware. In addition, I/O interfaces 130 and 140 may include output hardware such as displays possibly with touchscreen inputs, a sound speaker, other audio output mechanism, a haptic feedback system, and/or other output hardware.

In some embodiments, communication interfaces 132 and 142 may take a variety of forms and may be configured to allow client devices 104 and 106 to communicate with one or more devices according to any number of protocols. For instance, communication interfaces 132 and 142 may be configured to allow client devices 104 and 106, respectively, to communicate with the server device 102 via the communication network 108.

The processors 134 and 144 may include general purpose processors and/or special purpose processors. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon machine-readable instructions that, when executed by processors 134 and 144, cause client devices 104 and 106 to perform operations, respectively, such as those described in this disclosure and illustrated by the accompanying figures. Such machine-readable instructions may define or be part of a discrete software application, such a native app and/or web app, that may be executed upon user input.

Figure 2A:
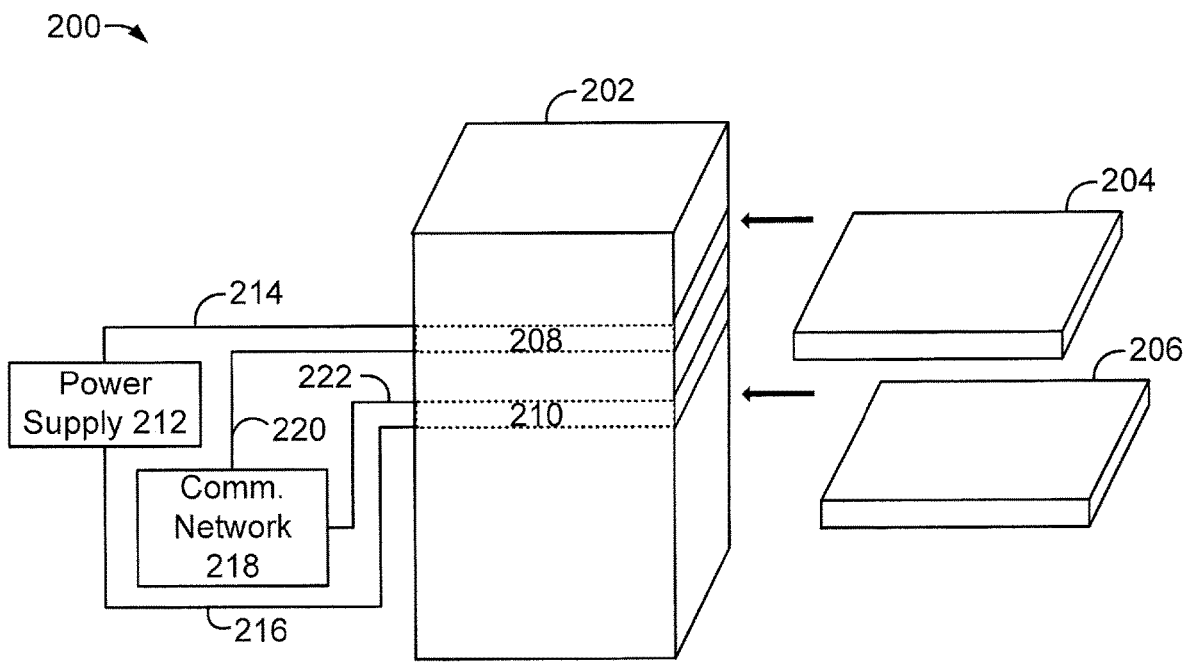
FIG. 2A illustrates an exemplary server device configured to support a set of trays, according to an embodiment.

FIG. 2A illustrates an exemplary server device 200 configured to support a set of trays, according to an embodiment. Server device 200 may, for example, take the form of the server device 102 described above in relation to FIG. 1. Further, the server device 200 may be configured to support, operate, run, and/or manage an event-ticket service and various types of data including event data, venue location data, interest data, data 4.

As shown, server device 200 may include a chassis 202 that may support trays 204 and 206, and possibly multiple other trays as well. The chassis 202 may include slots 208 and 210 configured to hold trays 204 and 206, respectively.

For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, during operation of server device 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the server device 200 may continue its normal operation without further interruptions.

The chassis 202 may be connected to a power supply 212 via connections 214 and 216 to supply power to the slots 208 and 210, respectively. The chassis 202 may also be connected to communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of communication network 108 described above in relation to FIG. 1. In some embodiments, communication network 218 may provide a network port, a network hub, a network switch, or a network router that may be connected to a telephone, Ethernet, or an optical communication link, among other possibilities.

Figure 2B:
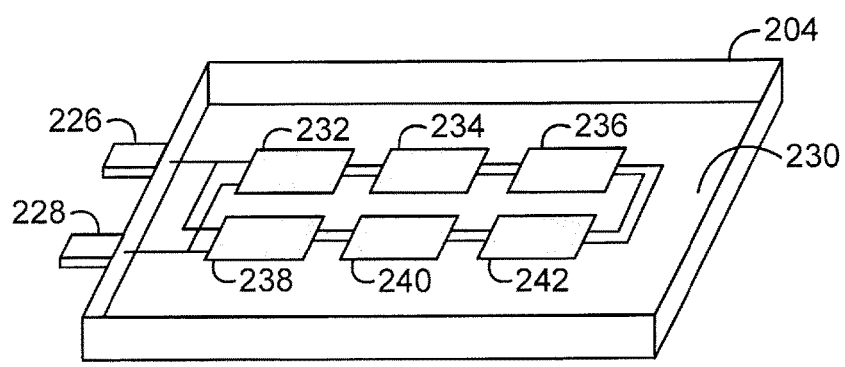
FIG. 2B illustrates an exemplary tray configured to support one or more components, according to an embodiment.

FIG. 2B. illustrates an exemplary tray 204 configured to support one or more components, according to an embodiment. The tray 204 may, for example, take the form of tray 204 described in relation to FIG. 2A. Further, the tray 206 may also take the form of the tray 204. As shown, the tray 204 may include a tray base 230 as the bottom surface of the tray 204 configured to support multiple components such as a main computing board connecting one or more components 232-240. The tray 204 may include a connector 226 that may link to the connections 214 or 216 to supply power to the tray 204. The tray 204 may also include a connector 228 that may link to the connections 220 or 222 to provide network connectivity to the tray 204. The connectors 226 and 228 may be positioned on the tray 204 such that upon inserting the tray 204 into the slot 208, the connectors 226 and 228 couple directly with the connections 214 and 220, respectively. Further, upon inserting the tray 204 into the slot 210, the connectors 226 and 228 may couple directly with connections 216 and 222, respectively.

The tray 204 may include components 232-242. In some instances, a communication interface 232, a transceiver 234, an interest processing component 236, an area processing component 238, a ticket processing component 240, and a data storage 242 may, for example, take the form of communication interface 112, the transceiver 114, the interest processing component 116, the area processing component 118, the ticket processing component 120, and the data storage 122, respectively. As such, the server 200 and the tray 204 may be configured to provide power and network connectivity to each of the components 232-242. In some embodiments, one or more of the components 232-242 may be provided via one or more circuits that include resistors, inductors, capacitors, voltage sources, current sources, switches, logic gates, registers, and/or a variety of other circuit elements. One or more of the circuit elements in a circuit may be configured to provide the circuit(s) that cause one or more of the modules 232-242 to perform the operations described herein. As such, in some embodiments, preconfigured and dedicated circuits may be implemented to perform the operations of the components 232-242. In other embodiments, a system may execute instructions on a non-transitory, computer-readable medium to configure one or more circuits as required to perform the operations described herein and illustrated by the accompanying figures.

Any two or more of the components 232-240 and/or the circuits described above may be combined to take the form of one or more general purpose processors, microprocessors, and/or special purpose processors, among other types of processors. For example, two or more of the communication interface 232, the transceiver 234, the interest processing component 236, the area processing component 238, the ticket processing component 240, and the data storage 242 may be combined with and/or within a processing device. Further, the combined processing device may take the form of one or more network processors, DSPs, PSOCs, FPGAs, and/or ASICs, among other types of processing devices and/or components. As such, the combined processing device may be configured to carry out various operations of the components 232-242.

In some embodiments, the communication interface 232 of the server device 200 may receive a search request for an event, where the search request includes event data indicating a venue location of the event. The interest processing component 236 of the server device 200 may determine an excitement interest in the event based on the event data and/or the interest data of a user account. The area processing component 238 of the server device 200 may determine one or more excitement areas at the venue location based at least on the excitement interest in the event. The ticket processing component 240 of the server device 200 may determine one or more available event tickets for the event at the venue location based on the one or more excitement areas at the venue location. The transceiver 234 of the communication interface 232 may transmit an indication of the one or more available event tickets to a client device such as those described above in relation to FIGS. 1-2B configured to access the one or more available event tickets.

In some embodiments, a non-transitory computer-readable medium may have stored thereon machine-readable instructions that, when executed by the server device 200, causes the server device 200 to perform operations. The operation may include receiving, by the communication interface 232 of the server device 200, event data that indicates an event at a venue location. The operations may include determining, by one or more components 236, 238, and/or 240 of the server device 200, an interest in the event based on at least one of the event data and interest data of a user account. The operations may include determining, by the one or more components 236, 238, and/or 240, one or more interest areas at the venue location based on the determined interest in the event. The operations may include determining, by the one or more components 236, 238, and/or 240, one or more available event tickets for the event at the venue location based at least on the one or more interest areas. The operations may include transmitting, by a transceiver 234 of the communication interface 232, an indication of the one or more available event tickets to a client device described above configured to access the user account.

Figure 3:
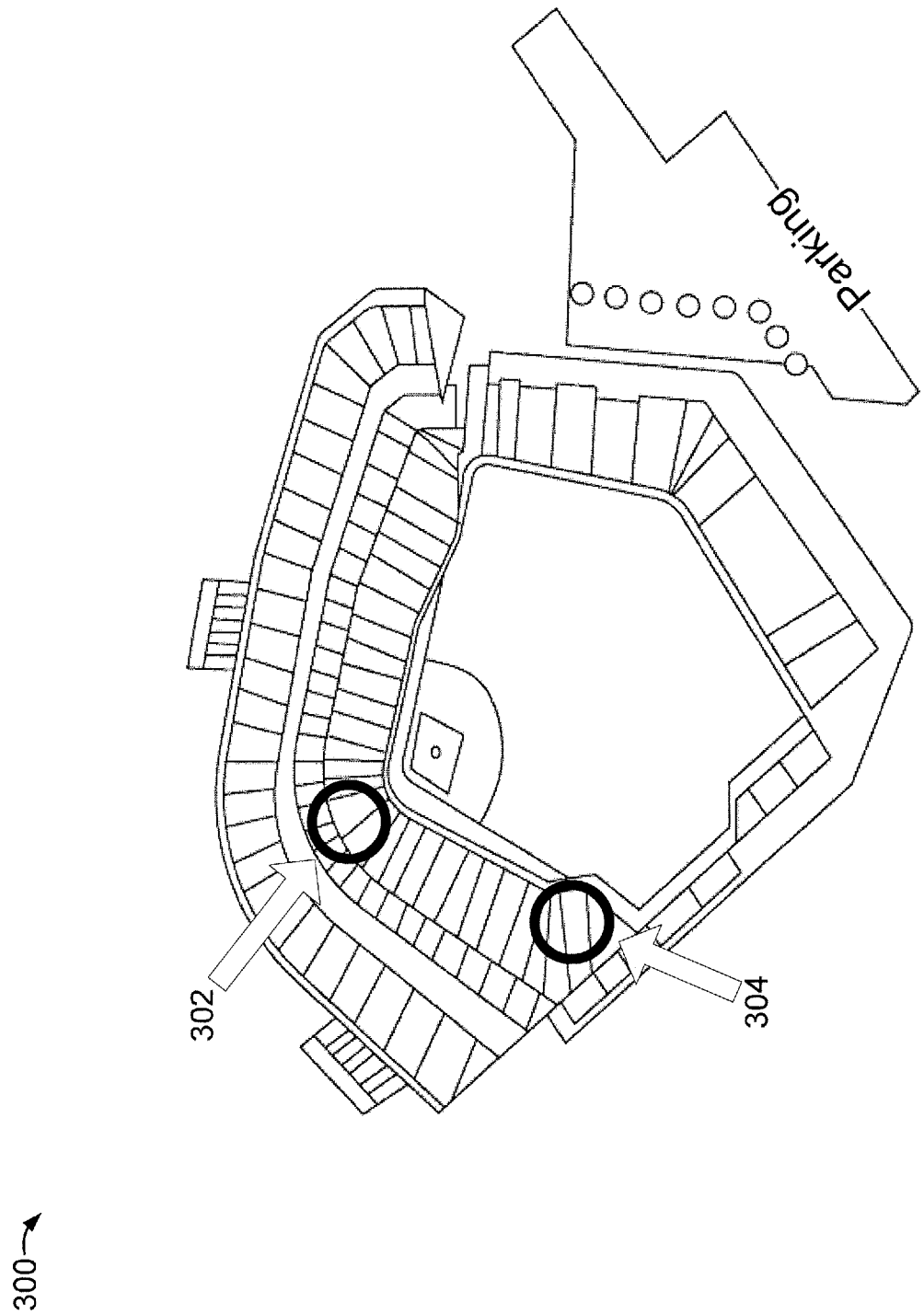
FIG. 3 illustrates a venue location including one or more interest areas, according to an embodiment.

FIG. 3 illustrates a venue location 300 including interest areas 302 and 304, according to an embodiment. In some embodiments, a system may include a server device such as those described above in relation to FIGS. 1-2B. In particular, the server device may include a communication interface, an interest processing component, an area processing component, a ticket processing component, and a transceiver such as those described above in relation to FIGS. 1-2B. In some instances, the communication interface of the server device may receive a search request for an event, such as a sports event, a performance event, a concert event, a movie event, and/or a comedic event, among other types of events. For example, the communication interface may receive the request from a smartphone of a particular user interested in securing tickets for a particular event. The search request may include event data indicating a venue location of the event such as, for example, a stadium, an arena, a field, and/or another setting such as an auditorium and/or a theatre for other types of events. As shown in FIG. 3, the event data may indicate the venue location 300 of a baseball stadium.

In some embodiments, the interest processing component may determine an excitement interest in the event such as the baseball game, possibly based on the event data and/or interest data associated with the user's account. For example, the user may indicate an excitement interest in the search request for available event tickets to the baseball game at the venue location 300. In some instances, the server device may access data from the user's account for securing event tickets, possibly indicating the interests of the user based on previous event tickets purchased by the user.

In some embodiments, the area processing component of the server device may determine one or more excitement areas 302 and/or 304 at the venue location 300 based on the excitement interest in the baseball game event. For example, the area processing component may determine the area 302 based on the batters or players of the home team and/or visiting team. For example, the view from the area 302 may provide one or more batter perspectives and/or batter viewpoints based on the batter's hits, contacts between the bat the ball, and/or ball trajectories per inning and/or throughout multiple innings of the baseball game. Further, the area processing component may determine one or more excitement areas 302 and/or 304 based on statistical analyses such as a particular batter's hitting percentage against one or more pitchers (e.g., the starting pitcher) of the opposing team, for instance. Further, the view from the area 302 may include views of pitches from various pitchers on the home and/or visiting team. In some instances, the area 304 may be located proximate to an entrance and/or an exit of the players participating in the baseball game, such that fans may reach out and give "high fives" to the players as they enter/exit the game.

In some embodiments, a ticket processing component of the server device may determine one or more available event tickets for the event at the venue location 300 based at least on the one or more excitement areas 302 and/or 304 at the venue location 300. For example, the ticket processing component may search an event-ticket database for available seats in the excitement areas 302 and/or 304. The ticket processing component may search for the available seats by quantity, price, section, row, and/or seat number in the excitement areas 302 and/or 304. As such, the ticket processing component may determine, identify, and/or locate, the one or more available event tickets in the excitement areas 302 and/or 304.

In some embodiments, a transceiver of the communication interface may transmit an indication of the one or more available event tickets to a client device configured to access the one or more available event tickets. For example, the transceiver may transmit the indication to the smartphone of the user interested in securing and/or purchasing the event tickets to the baseball game. As such, the user may provide payment information to secure the event tickets for the baseball game.

In some embodiments, the interest processing component may determine the excitement interest based on the event data of the search request. For example, the excitement interest may indicate one or more preferences to sit in close proximity to the players on the field at the venue location 300. As such, the area processing component may determine that the one or more excitement areas 302 and 304 include an area within a radius from the event, e.g., the baseball field, the home plate, and/or the pitching mound, among other areas of the venue location 300.

In some embodiments, the area processing component may determine the one or more excitement areas 302 and 304 include an area expected to receive souvenirs from the event location. For example, the area processing component may determine that the area 302 includes an area expected to receive baseball hats, batting gloves, jerseys, and/or other forms of memorabilia from the baseball game based on statistical analyses, performances, and/or player behaviors. Further, the area processing component may determine that the area 302 includes an area expected to receive foul balls from one or more batters in the baseball game, possibly based on the availability and/or health of the players. It should also be noted that the venue location 300 may host other events such a football game, a soccer game, a track and field event, a concert and/or other performing events. For example, the venue location 300 may host a football game where the area processing component may determine that the areas 302 and 304 include an area expected to receive footballs from players that score touchdowns, possibly based on statistical analyses of player behavior and/or performances. Yet further, the areas 302 and 304 may include an area where players jump or leap into the crowd after scoring touchdowns, among other possibilities.

In some embodiments, the area processing component may determine the one or more excitement areas 302 and 304 includes an area expected to seat one or more individuals identified in the event data and/or the interest data. The one or more individuals identified may include an athlete, such as a well-known athlete that broke one or more records. The one or more individuals identified may include a celebrity, such as a famous individual, a celebrated person, and/or a political figure, such as a politician, a governor, a senator, a representative, a vice president, among other political persons. For example, the event data of the search request may indicate an interest in a famous athlete that has previously attended baseball games at the venue location 300. As such, the area processing component may determine the excitement area 302 includes an area expected to seat the famous athlete. Yet, in another example, the interest data from the user account may indicate an interest in an actor celebrity who has previously attended certain baseball games at the venue location 300. In such instances, the area processing component may determine the excitement area 304 includes the area expected to seat the actor identified in the interest data.

In some embodiments, the event data may indicate at least one of a home team of the venue location 300, a visiting team to the venue location 300, and a level of importance of the event. The level of importance may indicate a rivalry between two or more teams, a tournament, a series, a playoff, a quarterfinal competition, a semifinal competition, a final competition, a championship, a high profile competition, a competition on national television, and/or other signs of importance. In some instances, based on this event data, the area processing component may determine the area expected to seat the one or more individuals identified. For example, consider the scenario above where the event data indicates the interest in the famous athlete. In such instances, the event data may further indicate a visiting team to the venue location 300, possibly where a relative of the famous athlete is playing for the visiting team. As such, based on this information, the area processing component may determine the area expected to seat the famous athlete.

In some embodiments, the interest processing component may determine the excitement interest in the event based on the interest data of the user account. Further, in some instances, the indication of the one or more available event tickets may include an interest level corresponding to the interest data of the user account. The interest level may include a pie chart, a doughnut chart, a polar area diagram, a ring chart, a sunburst chart, a bar graph, and/or other types of statistical charts and graphs. For example, the interest processing component may determine the excitement interest based on the interest data indicating an interest in the famous athlete as described above. Yet further, the indication of the one or more available event tickets may include a high and/or strong interest level (e.g., a pie chart substantially or fully filled in) based on the one or more available tickets designating seats in the same area expected to seat the famous athlete.

In some embodiments, the transceiver may transmit an indication of the one or more available event tickets to a client device that takes the form of a wearable computing device. As such, the wearable computing device may be configured to display the indication of the one or more available event tickets, possibly including the interest level as described above. In some instances, the wearable computing device may be configured to display a view from the one or more excitement areas at the venue location 300. For example, the view may provide an augmented reality and/or experience based on the perspective from the one or more excitement areas 302, possibly looking towards the baseball field and/or one or more surrounding areas of the venue location 300.

In some embodiments, a user may be searching for tickets to a baseball game, possibly on a Friday night at a baseball stadium. For example, consider a scenario where the user may be interested in trying to get an autograph from a player on the home team. Yet, the system may determine that the player is suffering a minor injury and is unlikely to be suited or present for the game. As such, the system may calculate a low probability of the user getting the autograph. Yet, in some instances, the system may determine a greater probability of the user getting the autograph from a baseball game scheduled at the baseball stadium next Saturday. The system may identify that the player's injury may be likely healed by the time of the baseball game scheduled for next Saturday. As such, the system may calculate a higher probability of the user catching the player and asking for an autograph. The system may also determine areas where the user is likely to catch the player during or after the game, possibly next to the home dugout. As such, the system may send indications of available tickets in such areas for the game along with the probabilities of the user catching the player during the game.

In some instances, the system may send such indications according to the user's interest in the player. For example, the system may determine the level of interest, possibly a high interest or a low interest in the player, to determine whether alternative or additional events may be indicated to the user. In some instances, the system may determine a high level of interest in getting the autograph from the player and indicate multiple games where the user may have a higher probability of getting the autograph. In some instances, the system may determine a lower level of interest in getting the autograph from the player and indicate one or a few games where the user may be able to obtain the autograph.

Figure 4:
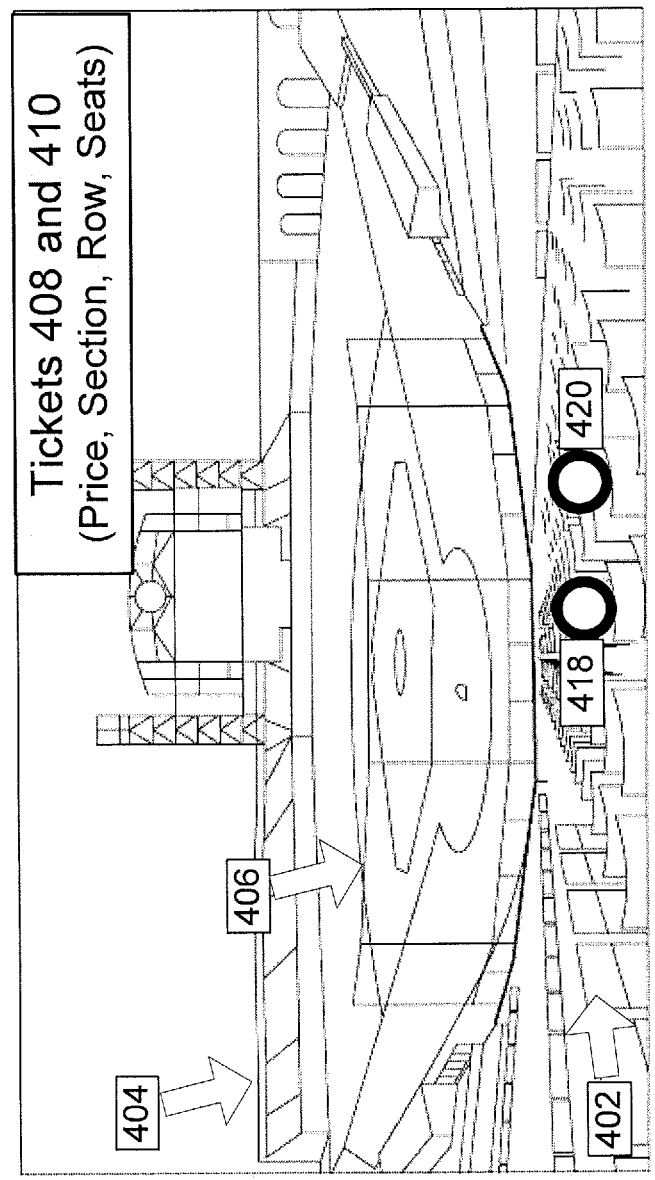
FIG. 4 illustrates a venue location including one or more interest areas, according to an embodiment.

FIG. 4 illustrates a venue location 400 including one or more interest areas 402 and 404, according to an embodiment. The venue location 400 may, for example, take the form of the venue location 300 as described above in relation to FIG. 3. In some embodiments, a non-transitory computer-readable medium may have stored thereon machine-readable instructions. The instructions may be executed by a server device such as those described above in relation to FIGS. 1-3. For example, the server device may include a communication interface, a transceiver, and one or more components including an interest processing component, an area processing component, and/or a ticket processing component, such as those described above in relation to FIGS. 1-3. In some embodiments, the instructions may cause the server device to perform operations.

In some embodiments, the operations may include receiving, by the communication interface of the server device, event data that indicates an event at the venue location 400. The event may be a baseball game, another type of sporting event, a performance event, a concert event, a movie event, and/or a comedic event such as those described above in relation to FIGS. 1-3. Yet, it should be noted that the event may also be an indoor event such as a basketball game, a volleyball game, a wrestling event, a boxing event, a mixed martial arts event, an indoor track and field event, an indoor concert, and/or another indoor performing event.

In some embodiments, the operation may include determining, by one or more components of the server device, an interest in the event based on the event data and/or interest data of a user account. For example, the event data may be generated by the one or more components based on a search request received by the communication interface. Further, the interest may include a safety interest in the event, possibly a safety interest in keeping certain individuals, e.g., children, pregnant, and elderly individuals, protected during the baseball game, possibly to seat the individuals away from loud speakers, foul balls hit from the batters, and/or broken bats, e.g., debris, that may harm and/or injure the individuals. Yet further, the safety interest may include keeping the individuals away from certain crowds, possibly including certain fans that may be intoxicated and/or hostile towards rival teams and/or players.

In some embodiments, the operations may include determining, by the one or more components, one or more interest areas 402 and 404 at the venue location 400 based at least on the interest in the event. For example, considering the scenario of the safety interest in the event, the one or more interest areas 402 and/or 404 may keep certain individuals safe from foul balls. In particular, the area 402 may be protected from foul balls by the foul ball barrier 406. Further, the area 404 may include less crowded areas and/or possibly quieter areas better suited for certain individuals such as children, newborns, pregnant, and/or elderly individuals, among other individuals interested in safer areas.

In some embodiments, the operations may include determining, by the one or more components, one or more available event tickets for the event at the venue location 400 based at least on the one or more interest areas 402 and 404. For example, a ticket processing component, such as those described above in relation to FIGS. 1-3 may search an event-ticket database for available event tickets for seats in the interest areas 402 and/or 404. The ticket processing component may search, identify, and/or locate available event tickets 408 and 410 for seats 418 and 420, respectively, in the interest area 402. In some instances, the tickets 408 and 410 may be located based on price, section, row, seat, seat number, and/or the quantity/price of tickets requested in the interest areas 402 and/or 404. Further, the operations may include transmitting, by a transceiver of the communication interface, an indication of the one or more available event tickets 408 and 410 to a client device configured to access the user account.

In some embodiments, the one or more interest areas 402 and/or 404 may include a safe area outside of a distance from the event. For example, interest area 404 may include one or more safe areas outside of the distance from the baseball field, the home plate, and/or the pitching mound, among other areas of the venue location 400.

Figure 5:
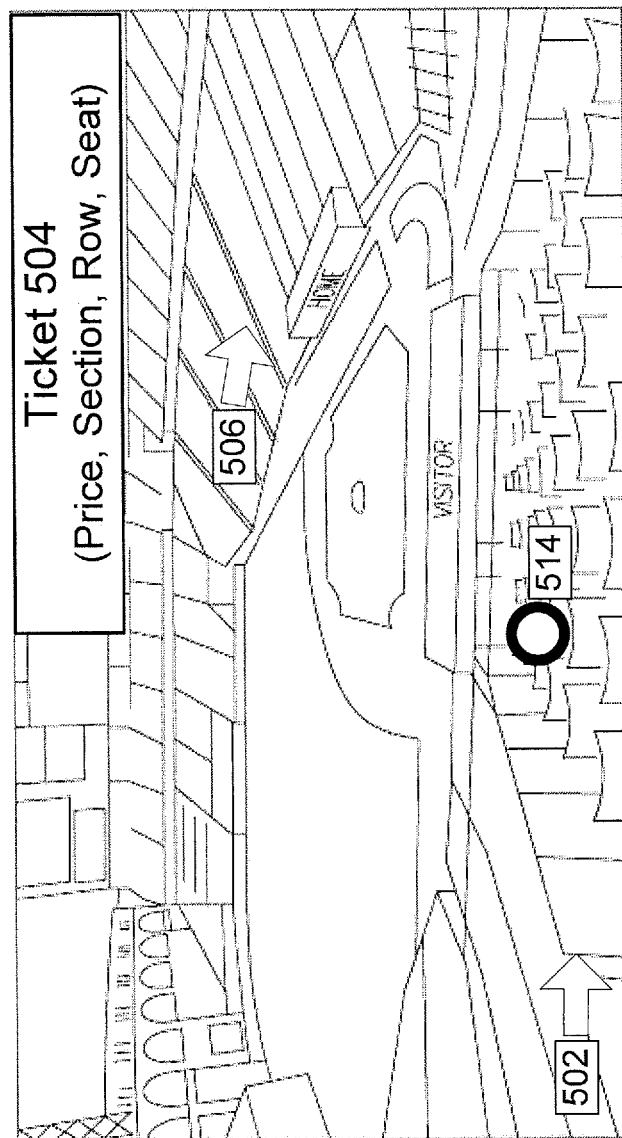
FIG. 5 illustrates a venue location including one or more interest areas, according to an embodiment.

FIG. 5 illustrates a venue location 500 including one or more interest areas 502, according to an embodiment. The venue location 500 may, for example, take the form of the venue locations 300 and/or 400 as described above in relation to FIGS. 3 and 4, respectively. As noted, various operations, such as those described above in relation to FIG. 4, may include determining one or more interest areas at a venue location based on the interest in the event. In some instances, determining the one or more interest areas may also include determining an area 502 expected to seat one or more individuals identified in the event data and/or the interest data.

In some instances, the one or more individuals identified may include an athlete, a celebrity, and/or a political figure, among other types of individuals described above in relation to FIGS. 3 and 4. For example, considering one or more scenarios described above, the one or more interest areas may include the area 502 expected to seat the famous athlete whose relative is playing for the visiting team. In some instances, various interests (e.g., comfort, relaxation, and/or safety interests) may be satisfied while also addressing an interest in the individuals identified, such as the famous athlete. In some embodiments, determining the area expected to seat the one or more individuals identified may be based on determining the venue location 500, a home team of the venue location 500, a visiting team to the venue location 500, and a level of importance of the event such as those described above in relation to FIGS. 3 and 4.

In some instances, determining the one or more interest areas may include determining the area 502 separated from other areas 506 expected to receive souvenirs from the event location 500. As shown, the area 502 may satisfy and/or address some interests including a comfort, relaxation, and/or a safety interest. For example, the area 502, behind the visiting team's dugout/bench may be separate from the area 506 proximate to the home team's dugout/bench where various souvenirs may be thrown into the crowd. Further, the area 506 may be crowded with fans cheering for the home team whereas the area 502 may be less crowded and quieter. In some instances, the area 502 may be determined based on analyzing statistical performance, behaviors, and the availability of players participating in the event. For example, the area 502 may be determined based on analyzing the statistical performance and behavior of a third baseman that is available to play for the visiting team. For instance, the third baseman may be a popular player, possibly recently becoming available to play after recovering from an injury. As such, the area 502 may be determined to be proximate to where the third baseman would play during the event.

In some embodiments, the ticket processing component may search, identify, and/or locate an available event ticket 504 for seat 514 in the interest area 502. In some instances, the ticket 504 may be located based on price, section, row, seat, seat number, and/or the quantity/price of tickets requested in the interest area 502. Further, the operations may include transmitting, by a transceiver of the communication interface, an indication of the available event ticket 502 to a client device configured to access the user account.

Figure 6:
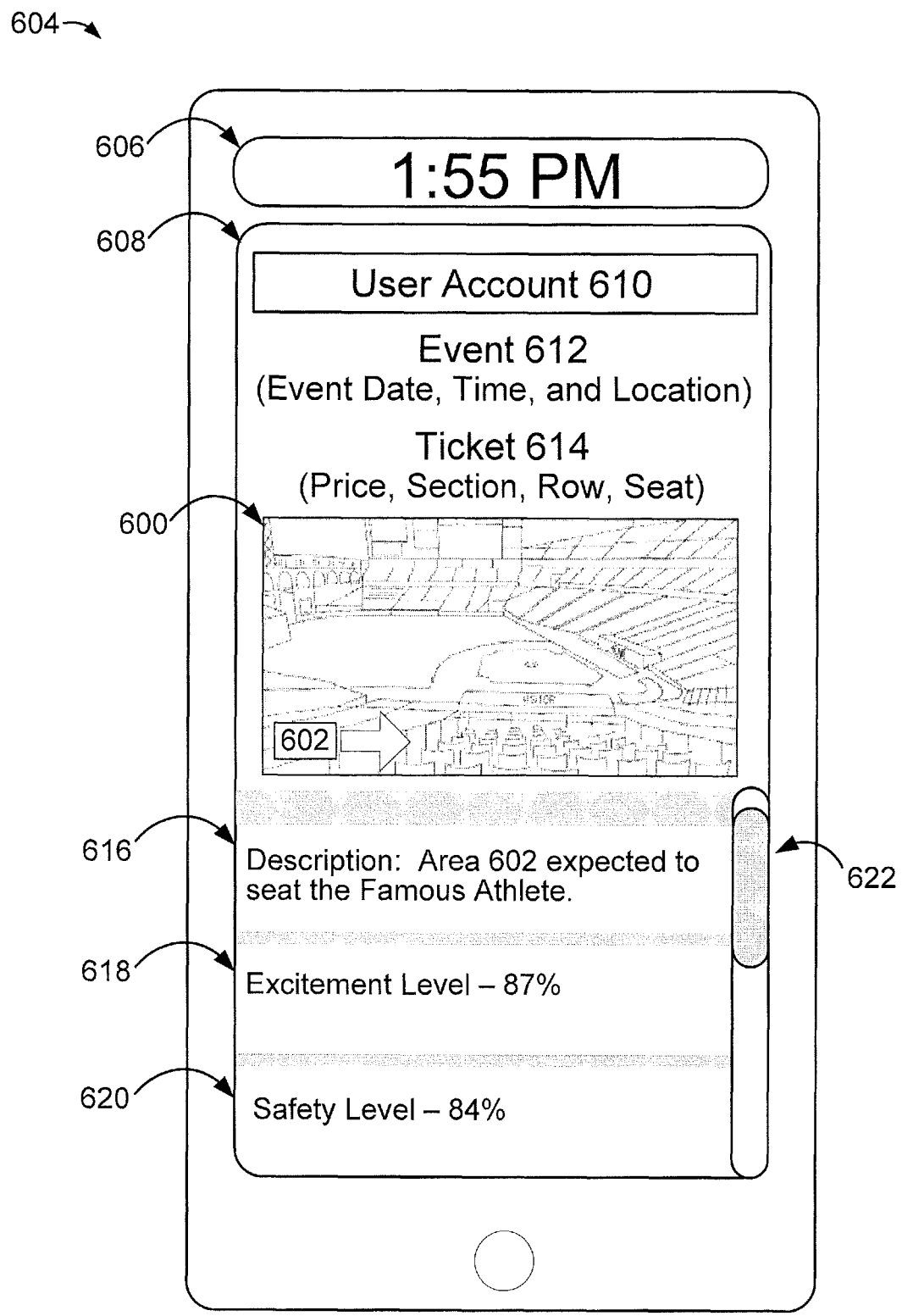
FIG. 6 illustrates a venue location including one or more interest areas displayed on a client device, according to an embodiment.

FIG. 6 illustrates a venue location 600 including one or more interest areas 602 displayed on a client device 604, according to an embodiment. The venue location 600 may, for example, take the form of the venue locations 300-500 as described above in relation to FIGS. 3-5, respectively. Further, the interest area 602 may take the form of interest area 502 described above in relation to FIG. 5. In addition, the client device 604 may take the form of one or more client devices described above in relation to FIGS. 1-5 such as client devices 104 and 106, for example. As shown in FIG. 6, the client device 604 may display the time 606 as "1:55 PM" along with event data and/or interest data for the user account 610.

As noted, various operations, such as those described above in relation to FIGS. 4-5, may include determining an interest in the event based on the event data and/or the interest data of the user account. As shown in FIG. 6, determining the interest in the event 612 may be based on the interest data of the user account 610. Further, the indication 608 of the one or more available event tickets 614 may identify the user account 610 and the event 612. Also, the indication 608 may include a view of the venue location 600 from the interest area 602, a description 616 of the area 602 expecting to seat the famous athlete, an excitement level 618 indicating 87% possibly based on the description 616, and/or a safety level 620 indicating 84% corresponding to interest data of the user account 610, among other forms of event data and/or interest data. In addition, a scroll 622 may be used to view the other forms of event data and/or interest data.

Figure 7A:
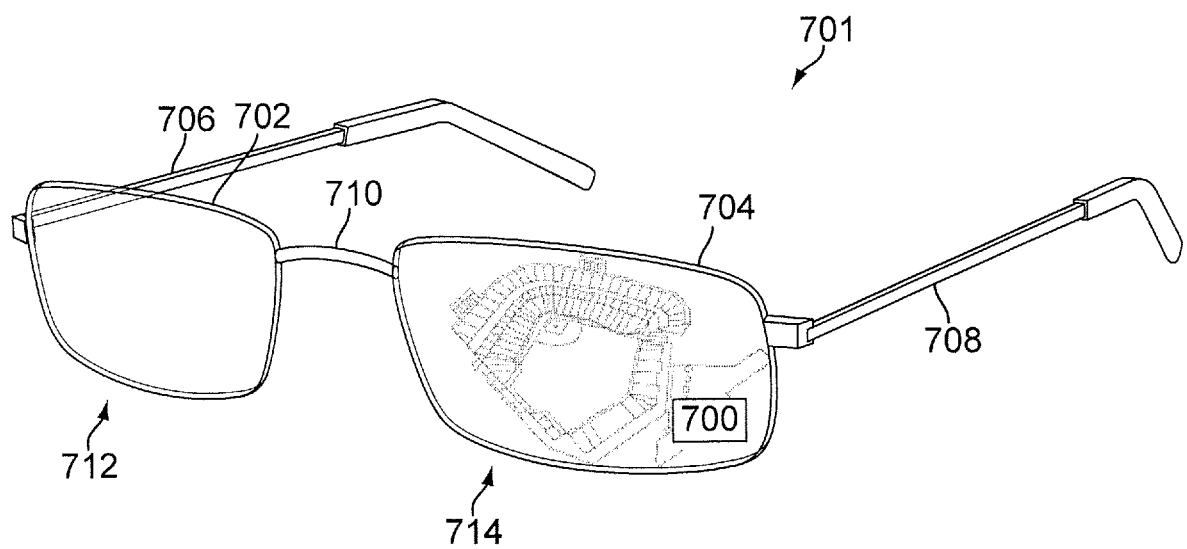
FIGS. 7A and 7B illustrate a venue location including one or more interest areas displayed on a client device, according to an embodiment.
Figure 7B:
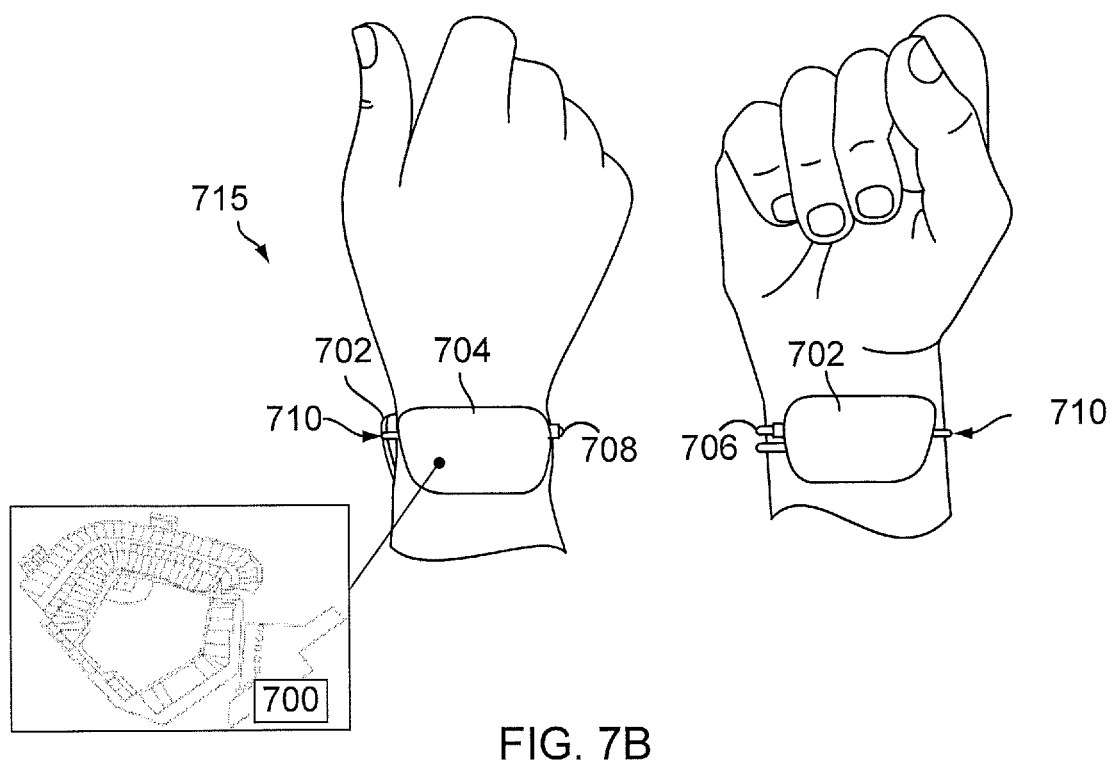

FIGS. 7A and 7B illustrate a venue location 700 including one or more interest areas displayed on a client device 701. The client device 701 may, for example, take the form of any of the client devices described above in relation to FIGS. 1-6, such as a client device 104. For example, the I/O interface 702 may take the form of I/O interface 130 as described above in relation to FIG. 1, As shown, the client device 701 may take the form of a wearable computing device with a head-mountable display and/or an arm-mountable display.

In FIG. 7A, the client device 701 may take the form of a head-mountable display/device (HMD). The client device 701 may include lenses 702 and 704. The client device 701 may also include a side component 706, a side component 708, and a middle component 710. For example, the computing device 701 may be mountable on a user's head such that the side component 706 rests on one ear of the user and the side component 708 rests on the other ear of the user. Further, the middle component 710 may rest on the nose of the user. In some instances, when the device 701 is mounted on the user's head, the lenses 702 and 704 may be positioned in front of the user's eyes. Further, the lenses 702 and 704 may include displays 712 and 714, respectively. In some instances, the displays 712 and 714 may be transparent, partially see-through, and/or configured to provide an augmented reality. As noted above, the non-transitory computer-readable medium may cause the server to perform the operations. In some instances, the operations may include causing the client device 701 to display a view from the one or more interest areas at the venue location 700.

As shown in FIG. 7B, the client device 701 may take the form of an arm-mountable device and/or a wrist-mountable device. For example, the side components 706 and 708, the middle component 710, and/or the lenses 702 and 704 may be adjustable to fit/mount on an arm and/or a wrist 715 of a user. As shown, the lens 704 may be mounted/positioned on the top of the arm/wrist 715. The side components 706, 708, and/or the middle component 710 may be adjusted to fit around the arm/wrist 715. The lens 702 may be mounted/positioned on the bottom of the arm/wrist 715. In some embodiments, the client device 701 display a view of the venue location 700 possibly from one or more interest areas, an indication of one or more available event tickets, a description of the area expecting to seat an individual identified, an excitement level, a safety level, among other forms of event data and/or interest data described above in relation to FIGS. 1-6.

Figure 8:
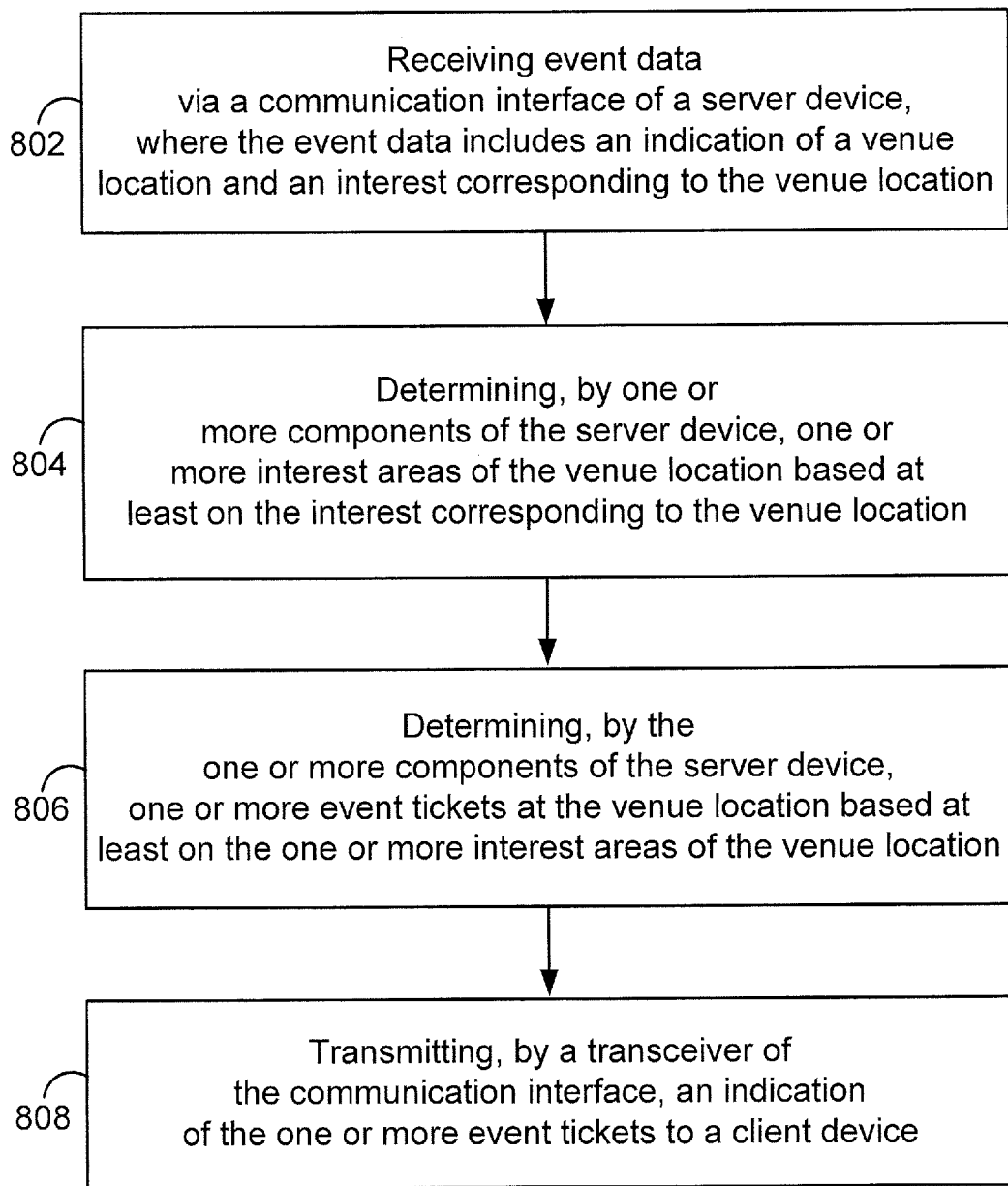
FIG. 8 is a flowchart of an exemplary method, according to an embodiment.

FIG. 8 is a flowchart of an exemplary method 800 for determining one or more available event tickets at a venue location, according to an embodiment. Note that one or more steps, processes, and methods described herein may be omitted, performed in a different sequence, and/or combined for various types of applications.

At step 802, the method 800 includes receiving event data via a communication interface of a server device, where the event data includes an indication of a venue location and an interest corresponding to the venue location. For example, the event data may be received by the server device in any manner described above in relation to FIGS. 1-7. Further, the event data may include an indication of the venue location such as those described above in relation to FIGS. 1-7. In some instances, the event data including the indication of the venue location and the interest corresponding to the venue location may be part of a search request from a user and/or a user account. Further, the event data may include an interest including an excitement interest, a safety interest, and/or a comfort interest, among other interests described above in relation to FIGS. 1-7.

At step 804, the method 800 includes determining, by one or more components of the server device, one or more interest areas of the venue location based at least on the interest corresponding to the venue location. For example, the one or more interest areas of the venue location may be determined based on an excitement interest, a safety interest, and/or an interest in an individual identified, among various other interests and/or combinations of interests, possibly provided in the search request.

At step 806, the method 800 includes determining, by the one or more components of the server device, one or more event tickets, e.g., available event tickets, at the venue location based at least on the one or more interest areas of the venue location. As noted, the one or more components, such as the ticket processing component, may search an event-ticket database for available seats in the interest areas of the venue location. For example, the ticket processing component may search for the available seats by quantity, price, section, row, and/or seat number in the interest areas.

At step 808, the method 800 includes transmitting, by a transceiver of the communication interface, an indication of the one or more available event tickets to a client device. The indication of the one or more available event tickets may be transmitted to various types of client devices described above in relation to FIGS. 1-7 including the client device 701 that may take the form of a head-mountable display/device (HMD). As such, the indication may provide one or more augmented reality views of the venue location from the interest areas, a description of the interest area expecting to seat the individual identified in the interest data, an excitement level, and/or a safety level, among other forms of event data and/or interest data.

In some embodiments, the one or more interest areas may include an excitement area within a distance from the event. In some instances, the event may include a sports event, a performance event, a concert event, a movie event, and/or a comedic event. For example, the event may include a football game where the one or more interest areas include an excitement area within a distance from a player entrance, a player exit, and/or a player resting area.

In some embodiments, determining the one or more interest areas may include determining an area expected to seat one or more individuals identified in the interest corresponding to the venue location. As noted, the individual identified may include an athlete, a celebrity, and/or a political figure, among other types of individuals identified above in relation to FIGS. 3-7. In some instances, determining the area expected to seat the one or more individuals identified is based on determining the venue location, a home team of the venue location, a visiting team to the venue location, and/or a level of importance of the event, among other factors described above in relation to FIGS. 1-7.

In some embodiments, determining the one or more interest areas of the venue location may be based on determining a probability of a ball landing within the one or more interest areas. In some instances, the probability may be based on the following:

$$\text{probability} = \frac{\sum \text{balls landing within the one or more interest areas in a time period.}}{\sum \text{balls landing in the venue location in the time period}}$$

In some instances, the time period may be based on a season and/or a particular time of the year, possibly corresponding to the weather. Further the time period may be based on the importance of the event indicating a rivalry between two or more teams, a tournament, a series, a playoff, a quarterfinal competition, a semifinal competition, a final competition, a championship, a high profile competition, a competition on national television, and/or other indications of importance described above in relation to FIGS. 3-7.

Yet further, the probability may be determined based on other factors such as the odds of foul balls and/or home run balls landing in the one or more interest area, offensive and/or defensive statistics, player statistics indicating strong hitters on a given team and/or weak pitchers likely to allow more hits and/or home runs, the level of skill of the players such as batters, pitchers, and outfielders competing in a baseball game, and/or football players likely to throw balls into the crowd after scoring touchdowns in a football game, kickers likely to kick footballs into the interest areas during field goals, among other factors described above in relation to FIGS. 3-7. That is, in accordance with implementation of the present invention, an interest level of a venue location may be determined based on statistical player/game analysis (e.g., high number of "big hitters" against weak pitcher, high scoring football game, etc.), player behavior and/or tendencies (e.g., a football player that typically throws footballs into the stands during a touchdown celebration and/or a baseball player that gives balls to fans after catching a fly-ball), and/or the availability of the players involved in the event.

In some embodiments, a user may be searching for tickets to a baseball game, possibly on a Friday night at a baseball stadium, for instance. For example, consider a scenario where the user may be interested in trying to catch a homerun ball from the home team. Yet, the system may determine that the pitchers expected to start on the visiting team have allowed fewer home runs than other pitchers. As such, the system may calculate a low probability, e.g., a 0.001% chance, of the user catching a homerun ball during the Friday night game. Yet, in some instances, the system may determine a greater probability of the user catching a homerun ball during a baseball game scheduled on Saturday night at the baseball stadium. The system may identify that the pitchers expecting to play on the visiting team on Saturday night have allowed more home runs than the visiting pitchers expected to start on Friday. Perhaps the visiting pitchers playing on Saturday night are second string pitchers due to injuries incurred to the first string pitchers. As such, the system may calculate a higher probability, e.g., a 0.1% chance, of the user catching a homerun ball on Saturday. The system may also determining areas where there may be closer to a 1% chance of the user catching a homerun ball during the Saturday night game, possibly based on partly on other fans planning to attend the game that may not be able to catch the ball. As such, the system may send indications of available tickets in the interest areas for the Friday and/or Saturday night game along with the respective probabilities of the user catching a homerun ball on a given night.

Referring back to FIG. 8, consider the method 800, where the one or more event tickets correspond to a first event on a first date. The method 800 may include determining, by the one or more components, one or more second interest areas of the venue location based at least on a probability of a ball landing proximate to the one or more second interest areas. The method 800 may also include determining, by the one or more components, one or more second event tickets at the venue location based at least on the one or more second interest areas of the venue location, where the one or more second event tickets correspond to a second event on a second date. As such, the indication of the one or more event tickets may include a second indication of the one or more second event tickets.

FIG. 9 illustrates a venue location 900 including one or more interest areas 902 recorded by a client device 904, according to an embodiment. The client device 904 may, for example, take the form of any of the client devices described above in relation to FIGS. 1-8. In some instances, the client device 904 may take the form of client device 104 described above in relation to FIGS. 1-3. Further, client device 904 may include an I/O interface, a communication interface, and a processor that may take the form of I/O interface 130, a communication interface 132, and a processor 134 described above in relation to FIG. 1. In some instances, the client device 904 may be a drone device, a UAV device, a robotic device, a device capable of taking flight, and/or another type of mobile device capable of transmitting and/or receiving data.

As shown, the client device 904 takes the form of a drone device. The drone device 904 may include motors 908, 910, 912, and 914. Each of the motors 908-912 may rotate and/or propel such that the drone device 904 may be lifted off a ground surface and into the air. In some instances, the drone device 904 may be configured to fly above and/or within a stadium, an arena, a field, an auditorium, a theatre, and/or another setting. Further, each of the motors 908-912 may be controlled independently by navigation and altitude controls. For example, the drone device 904 may be controlled by another client device such as client device 106 to fly above and/or around the interest area 902 that may, for example, include the interest area 302 described above in relation to FIG. 3. Further, the drone device 900 may be configured to capture multimedia data of the interest area 302 located below and/or proximate to the drone device 904.

In some instances, the drone device 904 may be configured to record various views from the one or more interest areas 902. For example, the drone device 904 may be configured to capture 360 degree-views from the interest area 302. Further, as shown, the drone device 904 may be configured to capture aerial views of the interest areas 302. In some instances, the drone device 904 may include a camera, a video camera, a thermal camera, an infrared camera, and/or other image recording devices configured to record various views proximate to the one or more interest areas 902. Further, the drone device 904 may include sensors such as heat sensors, sound recorders such as microphones, capacitive sensors, proximity sensors, and/or other types of sensors to detect and/or record temperatures, sound, and/or the number of individuals occupying the one or more interest areas 902. As such, various forms of multimedia data may be recorded and viewed in real-time by prospective users searching for available event tickets just prior to the event.

In some embodiments, a system may include a communication interface of a server device with means for receiving a search request for an event, where the search request includes event data indicating a venue location of the event. An interest processing component of the server device may include means for determining an excitement interest in the event based on at least one of the event data and interest data of a user account. An area processing component of the server device may include means for determining one or more excitement areas at the venue location based at least on the excitement interest in the event. A ticket processing component of the server device may include means for determining one or more available event tickets for the event at the venue location based at least on the one or more excitement areas at the venue location. A transceiver of the communication interface may include means for transmitting an indication of the one or more available event tickets to a client device configured to access the one or more available event tickets.

In some embodiments, a non-transitory computer-readable medium may have stored thereon machine-readable instructions that, when executed by a server device, cause the server device to perform operations described herein. A communication interface of the server device may include means for receiving event data that indicates an event at a venue location. One or more components of the server device may include means for determining an interest in the event based on at least one of the event data and interest data of a user account. The one or more components may also include means for determining one or more interest areas at the venue location based at least on the interest in the event. The one or more components may also include means for determining one or more available event tickets for the event at the venue location based at least on the one or more interest areas. A transceiver of the communication interface may include means for transmitting an indication of the one or more available event tickets to a client device configured to access the user account.

The above details description describes various features and functions of the disclosed systems, server devices, client devices, mediums, and/or methods with reference to the accompanying figures. It should be readily understood that the aspects of the present disclosure, as generally described herein, and illustrated in the figures, can be arranged, substituted, combined, separated, and designed in a wide variety of different configurations, all of which may be contemplated herein.

With respect to any or all of the message flow diagrams, scenarios, and flow charts in the figures and as discussed herein, each step, block and/or communication may represent processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage media.

The computer-readable medium may also include non-transitory computer-readable media such as media that stores data for short periods of time like register memory, processor cache, and/or random access memory (RAM). The computer-readable medium may also include non-transitory computer-readable media such as media that may store program code and/or data for longer periods of time, such as secondary or persistent long term storage, like read-only memory (ROM), optical or magnetic disks, and/or compact-disc read only memory (CD-ROM), for example. Thus, various forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. Moreover, a step or block that represents one or more information transmissions may correspond to information transmissions between software and/or hardware modules in the same physical device. Further, other information transmissions may be between software modules and/or hardware modules in different physical devices.

In various embodiments of the present disclosure, execution of instruction sequences to practice the present disclosure may be performed by a computer system. In various other embodiments of the present disclosure, a plurality of computer systems coupled by a communication link to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure and the accompanying figures may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A method comprising:
    obtaining an excitement interest corresponding to an action or person of interest identified by preferences of a user;
    determining, by one or more processors, one or more tickets for an event based on a one or more seats within a venue location and a probability of the action or presence of the person of interest occurring within a particular distance of the one or more seats within the venue location; and
    causing, by the one or more processors, transmission of the one or more tickets with the excitement interest to the user.

2. The method of claim 1, wherein the action or person of interest comprises at least one of: a proximity of a celebrity, a proximity of a political person, a proximity of an athlete, a fly ball, home run, a foul ball, or a receiving a memento from the event.

3. The method of claim 1, wherein multiple preferences of the user are based on a search request performed by the user.

4. The method of claim 1, wherein multiple preferences of the user are based on previous purchases of event tickets by the user.

5. The method of claim 1, wherein determining the probability of the action or presence of interest occurring within the particular distance of the one or more seats is based on a statistical analysis of data related to the event.

6. The method of claim 5, wherein a data related to the event is received by a third party configured to communicate with the one or more processors.

7. The method of claim 1, wherein the one or more tickets are transmitted to a smartphone of the user.

8. A system comprising:
    a non-transitory memory configured to store multiple instructions;
    one or more processors configured to execute the instructions from the non-transitory memory to cause the system to perform operations, the operations comprising:
    obtaining an excitement interest corresponding to an action or person of interest identified by preferences of a user;
    determining a one or more tickets for an event based on a one or more seats within a venue location and a probability of the action or presence of the person of interest occurring within a particular distance of the one or more seats within the venue location; and
    causing transmission of the one or more tickets with the excitement interest to the user.

9. The system of claim 8, wherein the action or person of interest comprises at least one of: a proximity of a celebrity, a proximity of a political person, a proximity of an athlete, a fly ball, a home run, a foul ball, or a receiving a memento from the event.

10. The system of claim 8, wherein multiple preferences of the user are based on a search request performed by the user.

11. The system of claim 8, wherein multiple preferences of the user are based on previous purchases of event tickets by the user.

12. The system of claim 8, wherein determining the probability of the action or presence of interest occurring within the particular distance of the one or more seats is based on a statistical analysis of data related to the event.

13. The system of claim 12, wherein the statistical analysis of data related to the event is received by a third party configured to communicate with the one or more processors.

14. The system of claim 8, wherein the one or more tickets are transmitted to a graphical user interface of a wearable computing device configured to display a simulated view from the one or more seats.

15. A non-transitory computer-readable medium having stored thereon machine-readable instructions that, when executed by a server device, cause the server device to perform operations comprising:
    obtaining an excitement interest corresponding to an action or person of interest identified by preferences of a user;
    one or more tickets for an event based on a one or more seats within a venue location and a probability of the action or presence of the person of interest occurring within a particular distance of the one or more seats within the venue location; and
    causing transmission of the one or more tickets with the excitement interest to the user.

16. The non-transitory computer-readable medium of claim 15, wherein the action or person of interest comprises at least one of: a proximity of a celebrity, a proximity of a political person, a proximity of an athlete, a fly ball, a home run, a foul ball, or a receiving a memento from the event.

17. The non-transitory computer-readable medium of claim 15, wherein multiple preferences of the user are based on a search request performed by the user.

18. The non-transitory computer-readable medium of claim 15, wherein multiple preferences of the user are based on previous purchases of event tickets by the user.

19. The non-transitory computer-readable medium of claim 15, wherein determining the probability of the action or presence of interest occurring within the particular distance of the one or more seats is based on a statistical analysis of data related to the event.

20. The non-transitory computer-readable medium of claim 15, wherein the one or more tickets are transmitted to a smartphone of the user.

* * * * *

UNITED STATES PATENT AND TRADEMARK OFFICE
CERTIFICATE OF CORRECTION

PATENT NO.          : 11,301,786 B2
APPLICATION NO.     : 16/788054
DATED               : April 12, 2022
INVENTOR(S)         : Romiwa Charles Akpala It is certified that error appears in the above-identified patent and that said Letters Patent is hereby corrected as shown below:

In the Specification

At Column 7, Line 63: Please delete "4" after "…venue location data, interest data, data…", and add --indicating available event tickets, and/or other forms of data described above.--

Signed and Sealed this
Thirtieth Day of August, 2022

*Katherine Kelly Vidal*
*Director of the United States Patent and Trademark Office*